(12) United States Patent
Lincoln et al.

(10) Patent No.: US 10,303,580 B2
(45) Date of Patent: May 28, 2019

(54) CONTROLLING DEBUG PROCESSING

(71) Applicant: International Business Machines Corporation, Armonk, NY (US)

(72) Inventors: Nicholas K. Lincoln, Middle Wallop (GB); Simon D. Stone, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 15/403,314

(22) Filed: Jan. 11, 2017

(65) Prior Publication Data

US 2018/0196736 A1    Jul. 12, 2018

(51) Int. Cl.
*G06F 9/50*     (2006.01)
*G06F 11/36*    (2006.01)

(52) U.S. Cl.
CPC ........ *G06F 11/3636* (2013.01); *G06F 9/5055* (2013.01)

(58) Field of Classification Search
CPC .................................. G06F 11/3636
USPC ............................................. 717/127
See application file for complete search history.

(56) References Cited

U.S. PATENT DOCUMENTS

| 5,632,032 A * | 5/1997 | Ault ............... G06F 11/3664 714/E11.21 |
| 6,546,443 B1 * | 4/2003 | Kakivaya ............ G06F 9/524 710/108 |
| 8,752,017 B2 | 6/2014 | Hossain et al. |
| 8,819,640 B2 | 8/2014 | Bates et al. |
| 9,164,813 B2 * | 10/2015 | Bates .................. G06F 9/526 |
| 9,201,759 B2 | 12/2015 | Wintergerst et al. |
| 9,251,040 B2 | 2/2016 | Cai et al. |
| 2003/0159133 A1 * | 8/2003 | Ferri ............... G06F 11/3636 717/130 |
| 2009/0138763 A1 * | 5/2009 | Arnold .............. G06F 11/366 714/45 |
| 2013/0074041 A1 * | 3/2013 | Bates ............... G06F 11/3632 717/124 |
| 2013/0219363 A1 | 8/2013 | Wu et al. |
| 2014/0173565 A1 | 6/2014 | Scholl et al. |
| 2015/0006968 A1 * | 1/2015 | ShanBhogue ....... G06F 11/0727 714/42 |
| 2015/0135165 A1 | 5/2015 | Simernitski et al. |

(Continued)

FOREIGN PATENT DOCUMENTS

WO    2015183276 A1    12/2015

OTHER PUBLICATIONS

Yunhui Zheng and Xiangyu Zhang. 2012. Static detection of resource contention problems in server-side scripts. In Proceedings of the 34th International Conference on Software Engineering (ICSE '12). IEEE Press, Piscataway, NJ, USA, 584-594 (Year: 2012).*

(Continued)

*Primary Examiner* — James D. Rutten
(74) *Attorney, Agent, or Firm* — Edward J. Wixted, III

(57) ABSTRACT

Execution of a debug process on a thread of an application is monitored to detect resource contention caused by the debug process. In response to detecting a contention for a resource caused by the debug process, execution of the debug process is controlled in accordance with a debug policy. The debug policy defines a control action to be implemented based on one or more rules.

20 Claims, 5 Drawing Sheets

(56) References Cited

U.S. PATENT DOCUMENTS

| | | |
|---|---|---|
| 2015/0143344 A1 | 5/2015 | Davis |
| 2016/0004863 A1* | 1/2016 | Lazri .................. G06F 9/45558 726/23 |
| 2016/0011958 A1 | 1/2016 | Smiljanic et al. |
| 2017/0090996 A1* | 3/2017 | Birke ........................ G06F 9/52 |

OTHER PUBLICATIONS

Cito et al., "The Making of Cloud Applications—An Empirical Study on Software Development for the Cloud", University of Zurich, Switzerland, Mar. 17, 2015, 17 pages.

\* cited by examiner

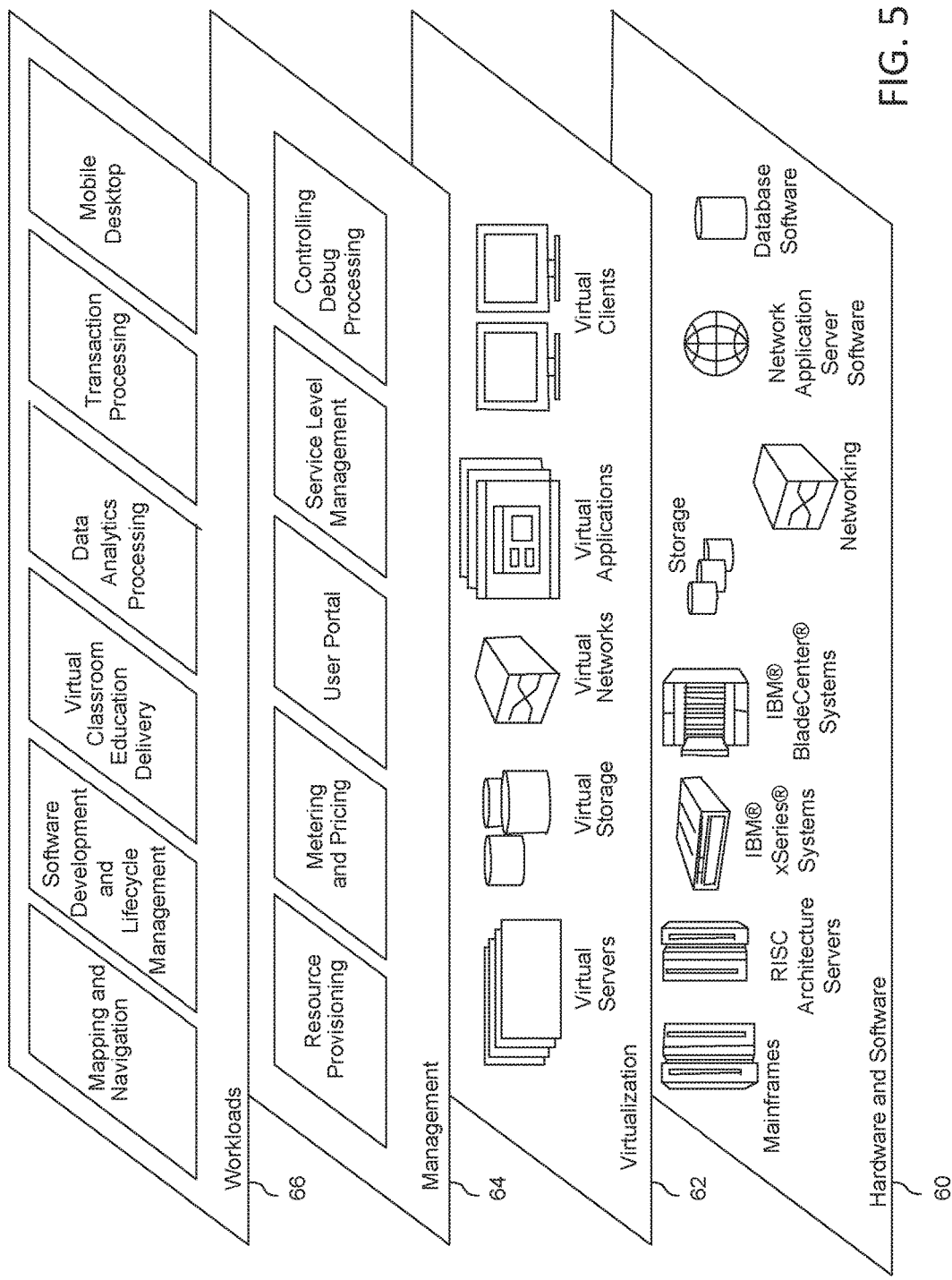

CONTROLLING DEBUG PROCESSING

BACKGROUND

The present invention relates to debugging of machine-executable code, and more particularly to avoiding or mitigating resource contention when debugging.

The present invention further relates to a computer program product comprising computer-readable program code that enables a processor of a processing system to implement a method for controlling debug processing.

It is known to execute debug processing to collect data for the purpose of analyzing and resolving a software problem. This may be done at a thread-specific level of granularity such that machine-executable code enters a "thread-specific debugging state". When in a thread-specific debugging state, data collection (for problem analysis and resolution) is enabled, but restricted to specific thread(s) at which the debugging state is directed.

One approach to triggering debug processing is to use tokens (included in a client request that requests a computer operation to be performed) to cause the processor that performs the requested computer operation to enter a "thread-specific-debug state" where debug information is collected and logged from some threads running on the processor, but not necessarily from all threads running on the processor. This approach may enable a developer to debug an application while other users remain free to use the application (via other threads, for example).

However, there may be processes within a running application that may cause a resource lock and subsequent resource contention. This may be undesirable, since it may impact other users of the application. For example, instances that may cause a lock contention include, but are not limited to: (i) a mutual exclusion (mutex) that protects access to an object—if the debugger acquires the mutex, then all other requests to access the object are blocked while waiting to acquire the same mutex; and (ii) a read/write lock that protects access to an object—if the debug process acquires a write lock, then all other requests are blocked while waiting to acquire a read or write lock.

Accordingly, the consequence of impacting other users when executing debug processing of a live application cannot be ignored. It may therefore be desirable to control debug processing so as to mitigate or eliminate such resource contentions.

SUMMARY

A method, computer program product, and/or system performs the following operations (not necessarily in the following order): (i) monitoring execution of a debug process on a first thread of an application to detect a contention for a resource caused by the debug process; and in response to detecting the contention for the resource caused by the debug process, controlling execution of the debug process in accordance with a debug policy. The debug policy defines a control action to be performed, based, at least in part, on one or more rules.

BRIEF DESCRIPTION OF THE DRAWINGS

FIG. 5 is a diagram of cloud computing abstraction model layers in accordance with at least one embodiment of the present invention.

DETAILED DESCRIPTION

Figure 1:
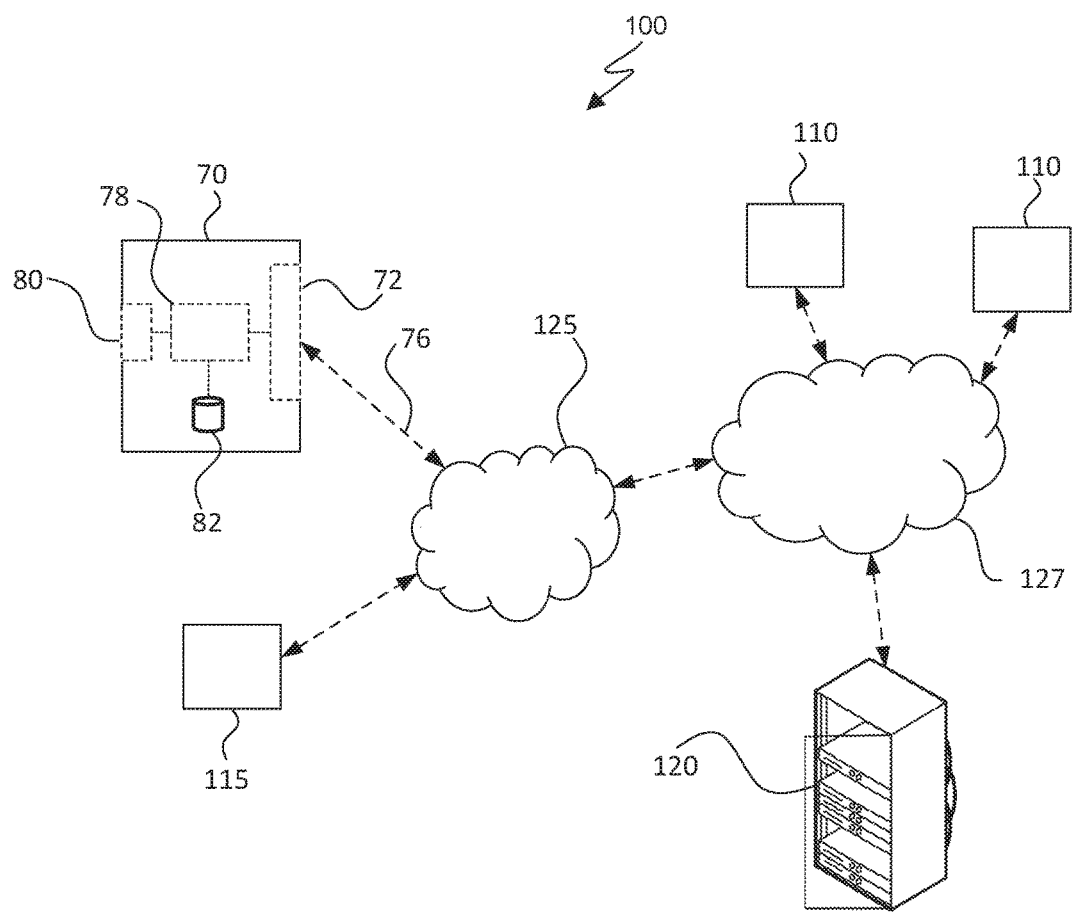
FIG. 1 is a block diagram of a computing environment in accordance with at least one embodiment of the present invention.

Some embodiments of the present invention may include one, or more, of the following features, characteristics and/or advantages: (i) reduces or eliminates the impact of debug processing, by a user of an application, on other users of the application; (ii) controls debug processing; (iii) monitors execution of a debug process, on a thread of an application, to detect resource contention caused by the debug process; and/or (iv) responds to detecting resource contention caused by the debug process by controlling execution of the debug process in accordance with a debug policy. The debug policy defines control action(s) to be implemented based on one or more rules. The rules relate to at least one of: the resource under contention, the thread being debugged, the application being debugged, and the debug process itself.

When debugging live applications, some embodiments of the present invention control the debugging process so as to reduce or mitigate resource contentions that may be caused by executing the debugging process on a live application used by other users. For example, a debug process may be controlled in accordance with a predetermined policy, wherein the policy defines how the debug process should be managed, executed or controlled so as to meet predetermined requirements (such as minimizing resource contention or preventing impact to other threads of the application). Embodiments may therefore be particularly advantageous in debugging of a Software as a Service (SaaS) application when multiple users may be using the application at a point in time. Such embodiments may enable an application to not be noticeably affected by debug processing for a particular user or transaction.

Some embodiments of the present invention control a debug process when it is detected that the debug process is causing (or is likely to cause) a resource contention. The manner by which the debug processing is controlled may depend on a debug policy that defines a preferred behavior or action to be undertaken. Such a policy may be user-defined according to user preferences (such as performance, responsiveness, memory and/or timing ideals) and/or generated based on an analysis of the application and system constraints. The manner in which the debug process is controlled may vary from preventing the execution of the debug process to having restrictions placed upon debugging in particular lock sections (such as having a maximal request queue size before automatically being moved to the next line outside the lock area for example).

In some embodiments, at all times that a debug process persists, the debug policy may define control of the debug process when it is in proximity to a lock area (for example, an application area in which execution of the debug process may cause resource contention).

Some embodiments of the present invention generate and/or use a debug policy that restricts a debugger from holding locks that may impact other users of a service. For example, a system administrator may define and/or apply a debug policy before granting access to the debugger. The system runtime (for example, a Java® virtual machine) may then enforce the policy during processing as the debugger steps through the program.

The debug policy may comprise one or more rules defining how the debug process may execute on the thread of the application. Thus, based on a debug policy associated with the application for example, the manner in which the debug process operates in an area of an application may be changed. This may vary from not being able to debug the area of the application at all to having restrictions placed upon debug process for one or more sections of the application.

In some embodiments of the present invention, the one or more rules may relate to at least one of: a depth of a request queue for the application; a frequency of resource use; a duration of resource contention; an acceptable time limit for the duration of a resource contention; a level of resource contention; a component criticality (for example, an indication that part of a transaction system forbids any debugging); time of day (for example, critical peak times); an indication of whether high-priority user requests are present on system; an indication of whether a high-priority user is making a debug request; and/or a batch identification. Various factors, which may influence application performance for example, may therefore be accounted for when defining how the debug process may execute. Minimum performance requirements may therefore be defined and accounted for when determining how the debug process is to be controlled. Embodiments may be adaptable to different requirements, as may be defined by a user or administrator for example.

A control action (of a debug policy) may comprise at least one of: preventing execution of the debug process; pausing execution of the debug process; resuming operation of thread; interrupting the thread; generating an exception signal; jumping to a new debug location (for example, after a detected resource conflict); forcibly detaching the debugger; and/or re-starting the process in a non-debug mode. Such control actions may be undertaken when the rules are not met for example. The actions may be undertaken at system run-time and may, for example, be used in isolation or combination according to requirements.

The debug policy may be associated with the application, and the method may further comprise: obtaining the debug policy from a server computer that implements at least part of the application. In this way, a debug policy may be application-specific and made available with the application. Also, debug policies may be centrally defined and made available by one more trusted parties. This may enable debug policies to be centrally managed, modified, stored and distributed.

Some embodiments may, however, further comprise the steps of: analyzing the application to identify one or more potential resource contention(s); and generating the debug policy based on the identified potential resource contention(s). A debug policy may therefore be locally generated according to requirements. Some embodiments of the present invention enable local and/or flexible control over generating, defining, storing and managing debug policies.

Some embodiments of the present invention further comprise initiating execution of the debug process on the thread of the application such that: (i) debug information is logged with respect to the thread; and/or (ii) debug information is not logged with respect to one or more other threads of the application. Such embodiments enable narrowly targeted data collection for analysis. For example, consider a product (running on a server, for example, an email server) that processes thousands of messages per second in a production scenario. Data collection related to a single message (among the thousands of messages processed per second) is enabled.

Controlling execution of the debug process may comprise: interrogating the debug policy to determine a control action to be performed, based on the detected resource contention; and/or performing the determined control action. Dynamic and flexible control of a debug process may therefore be implemented at system runtime. For example, a Java virtual machine may enforce the debug policy during debug processing as the debugger steps through the application program.

The application program may be implemented by a virtual machine. The application may be provided as a service of a cloud server. Embodiments may therefore be employed in a "software as a service" (SaaS) environment for the provision of cloud-based services over the internet for example.

The application program may implement at least one of the following types of computer operations: (i) hosting web applications; (ii) maintaining an index of information; (iii) maintaining a communications environment; (iv) sharing computing resources; (v) sharing a database; (vi) sharing files; (vi) providing email communications; (vii) intermediating between a client and a server; and/or (viii) hosting web pages.

Some embodiments may be implemented in: (i) a network node or module; (ii) a network component that is capable of executing computer program code and/or (iii) a server device such as a cloud-based server resource accessible via the Internet.

Some embodiments of the present invention include a user interface to receive a user input signal representative of one or more rules relating to at least one of: the resource; the thread; the application; and/or the debug process. Embodiments may therefore be thought of as providing an interface which enables a user to further specify information or data that may be relevant for the purpose of determining or generating a debug policy and/or control action. Such user-specified information may enable unique preferences, circumstances and/or conditions, specific to the user or the environment, to be accounted for when controlling debug processing.

The user interface may further enable a user to specify factors to be included in the determination of how to control debug processing, for example, by specifying a rule relating to a resource, a thread, an application, and/or the debug process. Embodiments may therefore provide input options, increasing the flexibility and power of debugging control.

In some embodiments, the apparatus (system) may further comprise a communication interface that is capable of communicating with one or more databases so as to obtain a debug policy.

In some embodiments of the present invention, there is a processing system comprising at least one processor and the computer program product according to one or more embodiments, wherein the at least one processor is capable of executing the computer program code of a computer program product according to an embodiment. The system may further comprise a display device for displaying a graphical or non-graphical (for example, and without limitation, auditory and/or tactile) user interface, wherein the user interface communicates information about a debug policy or control action to a user.

Some embodiments of the present invention comprise a client device including data processor device. The client device may be a standalone device for receiving information from one or more remotely positioned information sources (via a communication link for example) and/or accessing information, such as information stored in a database. In other words, a user (such as a system administrator, technician, programmer, developer etc.) may have an appropriately arranged client device (such as a laptop, tablet computer, mobile phone, personal digital assistant (PDA), etc.) which provides a system according to an embodiment of the present invention, and thus enables the user to control debug processing.

The system may comprise: a server device comprising the at least one processor, wherein the server device may be configured to transmit information relating to a debug policy and/or control action to a client device or communication network. In such a configuration, display instructions are made available by a server. A user may therefore link with the server to work with the system.

The processor may be located remotely from the display device, and a control signal may thus be communicated to the display device via a communication link. Such a communication link can be, for example, the internet and/or a wireless communication link. Other suitable short-range or long-range communication links and/or protocols may be employed. In this way, a user (such as a system administrator, programmer, developer, data analyst, engineer, etc.) may have an appropriately arranged device that can receive and process information according to an embodiment for controlling debug processing. Some embodiments of the present invention enable a user to remotely control the debug processing using a portable computing device, such as a laptop, tablet computer, mobile phone, PDA, etc.

The system may further comprise: a server device comprising the at least one processor; and a client device comprising a display device. Dedicated data processing means may therefore be employed for the purpose of controlling debug processing, thus reducing processing requirements or capabilities of other components or devices of the system.

Thus, it will be understood that processing capabilities may be distributed throughout the system in different ways according to predetermined constraints and/or availability of processing resources.

Some embodiments of the present invention monitor a debugging process and control the debugging process according to a policy when it is detected that there is resource contention caused by the debugging process. Some embodiments of the present invention may include one, or more, of the following features, characteristics and/or advantages: (i) reduces the impact of debug processing on live applications; and/or (ii) avoids or mitigates contention of resources that may be caused by the debug processing. For instance, a debug policy may define that a debug process for a user is to be paused or stopped while more than a predetermined number of users are using the same application (for example, via other threads). In this way, a potential negative impact to application performance as seen by other users may be avoided.

It should be understood that the Figures are merely schematic and are not drawn to scale. It should also be understood that the same reference numerals are used throughout the Figures to indicate the same or similar parts.

Some embodiments of the present invention provide a concept for controlling debug processing of live applications to avoid or mitigate contention of resources that may be caused by the debug processing. Debug processing is controlled by a debug policy which prescribes control actions according to rules that may be user-defined and/or generated by a system or administrator.

Some embodiments of the present invention further provide a computer program product including computer program code for implementing the proposed operation and debug control concepts when executed on a processor.

Some embodiments of the present invention yet further provide one or more network-enabled device component, capable of executing such computer program code.

In some embodiments of the present invention, a debug process is controlled according to a policy to avoid or reduce resource contentions that may otherwise be caused by executing the debug process on an application that is being used by multiple users simultaneously. The debug policy may define control actions based on rules relating to a system resource, application resource, application thread, and/or the debug process. By basing control actions on such rules, preferences relating to system or application performance may be accounted for when determining how to control the debug process. Some embodiments of the present invention therefore account for non-structured real-world connected systems/networks where there may be multiple interrelated resources which may be dynamically and simultaneously affected by debug processing and/or application usage.

If a resource contention occurs due to the debugging process, action to control the debugging process is undertaken in accordance with a predefined policy which may help to avoid or alleviate the resource contention. For example, a debug policy may define that all debugging processes are to be paused when a number of users simultaneously using an application exceeds a predetermined threshold value. Using that policy, a control action to pause debug processing may be undertaken when it is determined that the number of simultaneous users of the application exceeds the predetermined threshold value. In this way, resources used by the debug processing may be freed up or unlocked for use so as to improve available resources, and this may be done dynamically and according to requirements.

Some embodiments of the present invention manage or control debug processing by determining a control action to undertake according to a predetermined policy. In particular, a tailored control approach prescribes control actions based on rules relating to: (i) resources; (ii) active or available threads; (iii) the application being debugged; and/or (iv) the debug process. The collection of rules are implemented to resolve or alleviate resource contention in a manner which takes into account predetermined preferences (established in the debug policy for example).

The preferences may be taken into account with reference to one or more rules. Such rules, for example and without limitation, may relate to: (i) the depth of a request queue for the application; (ii) the frequency of resource use; (iii) the duration of resource contention; (iv) an acceptable time limit for the duration of a resource contention; (v) a level of resource contention; (vi) a component-specific restriction (for example, an indication that part of a transaction system forbids any debugging); (vii) the time of day (such as critical peak times, or low usage times); (viii) an indication of whether a high-priority user request is present on the system; (ix) an indication of whether a high-priority user is making a debug request; and/or (x) a batch identification. In this way, various factors which may influence application performance can be accounted for when defining how to control a debug process. For instance, minimum performance requirements may be defined and accounted for by a debug policy which prescribes debug control actions which in turn may ensure that the minimum performance requirements are met. Embodiments may thus be flexible and adaptable to a given set of requirements, as may be defined (and/or even later altered or modified, for example, by a user or administrator).

If a resource contention event is detected, the debug policy may be analyzed to identify what control action(s) may be performed. Identified control action(s) may then be assigned and executed, such that the resource contention is avoided or alleviated.

In some embodiments of the present invention, single threading/locks in running production cloud code are identified and skipped in the debugger to prevent deadlocks, to allow dynamic problem determination of customer cloud problems. Some embodiments include the following components: (i) a debugging component for attaching to a process and stepping through execution on a thread; (ii) a monitoring component for monitoring lock contention and impact to other threads when thread being debugged holds the lock; and/or (iii) a policy applying component for taking appropriate action as defined in a policy when a thread being debugged is holding a lock, or attempts to take a lock. Multiple users using an application are not noticeably affected by a debug process running for a particular user or transaction.

In some embodiments of the present invention, a debug management component receives information from an application and/or network-enabled devices and monitors one or more resources to determine when resource contention may occur. The debug management component analyzes the information and/or resource contention in conjunction with a debug policy to determine and assign one or more control actions to be implemented. A control signal identifying the control action(s) may be communicated, by the debug management component, to one or more network-enabled devices to implement and/or manage the control action(s).

In some embodiments of the present invention, concepts for determining and assigning control actions to an application or debugging process are implemented in a distributed fashion. In this way, a centralized processing resource may be avoided and, instead, processing requirements may be shared throughout the network according to available resources. This may provide the performance benefit of reducing an amount of processing or network traffic directed to a single network node.

Some embodiments control debug processing according to a predetermined debug policy which is designed to maintain preferred performance standards, using dynamic distributed debug control concepts.

Modifications and additional steps to traditional debug processing may also be proposed which may enhance the value and utility of the proposed concepts.

Embodiments may be employed in at least the following devices: (i) an internet-enabled electronic device; and/or (ii) a server device such as a cloud-based server resource accessible via the Internet. Embodiments may thus be utilized in many different types of distributed processing environments.

It should be appreciated that the figures are only illustrative and not intended to assert or imply any limitation with regard to the environments in which aspects or embodiments of the present invention may be implemented. It should also be understood that the Figures are merely schematic, are not drawn to scale, and the same reference numerals are used throughout the Figures to indicate the same or similar parts. Many modifications to the depicted environments may be made without departing from the spirit and scope of the present invention.

Also, those of ordinary skill in the art will appreciate that the hardware and/or architectures in the Figures may vary depending on the implementation.

Where embodiments of the present invention constitute a method, it should be understood that such a method is a process for execution by a computer, that is, a computer-implementable method. The various steps of the method therefore reflect various parts of a computer program, for example various parts of one or more algorithms.

Some embodiments of the present invention may include one, or more, of the following features, characteristics and/or advantages: (i) enhance a cloud-based service provisioning system by making debug processing more efficient or more adaptable to resource requirements; (ii) enable resources to be analyzed, and control of an application debug process to be implemented, to minimize or avoid resource contention that may negatively impact application performance for other uses of the system or application; and/or (iii) improve the processing capabilities or efficiency of a cloud-based service delivery system while also enabling live debugging.

Turning now to FIG. 1, an embodiment of computing system 100 will now be described. The embodiment comprises network-enabled device 70 which implements at least part of a method of controlling debug processing according to a proposed embodiment.

Network-enabled device 70 has communication interface 72 for communication with a remotely located network node (not shown) via a local area network (LAN 125), for example using wireless communication link 76, and or with internet 127 using any suitable short-range or long-range communication links and/or protocols as may be employed.

Communication interface 72 may communicate (for example, send and/or receive) information for the purpose of monitoring and controlling a debug process.

For storing such information, network-enabled device 70 may comprise data store 82. Data store 82 may be accessed by processor unit 78 of network-enabled device 70 for modifying, storing, reading, deleting, editing, swapping, etc. capability information of data store 82.

Communication interface 72 may also communicate a control signal indicative of a control action to be implemented for controlling a debug process. The control signal may, for instance, comprise information that may be used to control a particular debug process, application, or application resource. The control signal may therefore comprise information relating to at least one of: (i) a debug process identifier; (ii) a resource identifier; (iii) an application identifier; (iv) an action or command; (v) authentication information; (vi) a timestamp; and/or (vii) a request identifier.

Processor unit 78 may implement a debug processing control method which is capable of identifying an occurrence (or expected occurrence) of a resource contention caused by a debug process. Upon identifying an occurrence (or expected occurrence) of such a resource contention, processor unit 78 may generate a warning signal indicative of the (actual or expected) occurrence of resource contention and pass the generated error signal to communication interface 72. The communication interface 72 may communicate the generated warning signal to a remotely located network node (not shown) via internet 127, for example using a wireless communication link 76.

In the example embodiment of FIG. 1, communication interface 72 which is capable of receiving a control action assignment signal via internet 127. The control action assignment signal may be indicative of an assigned control action, wherein the control action has, for example, been assigned according to a debug policy. For this purpose, the control action assignment signal may comprise: (i) a control action identifier; (ii) a data payload; and/or (iii) a control action entry point data. Communication interface 72 may pass a received control action assignment signal to processor unit 78 for processing in accordance with one or more algorithms to identify the assigned control action from the received control action assignment signal. Processor unit 78 may then control operation of a debug process, application, or application resource so as to perform the assigned (that is, the identified) control action.

It is noted here that network-enabled device 70 of FIG. 1 may also comprise user input interface 80 for receiving a user input signal. The user input signal may include many different forms of data or information for purposes such as: (i) defining a debug policy; (ii) rules used by a debug policy; (iii) defining performance preferences; and/or (iv) setting performance and/or resource conditions and/or constraints. Thus, included in such user input signal may be one or more signals representative of rules relating to, at least one of: (i) a resource; (ii) a thread; (iii) an application; and/or (iv) a debug process. In this way, the device 70 may therefore be thought of as providing an interface which enables a user to further specify information or data that may be relevant for the purpose of determining or generating a debug policy and/or control action.

Computing system 100 further comprises a plurality of second network-enabled devices 110 that use one or more applications provided by cloud-based server 120. In this example, the second network-enabled devices 110 are connected to internet 127 via respective communication links. The first network-enabled device 70 is connected to LAN 125 via a wireless communication link 76. Wireless communication link 76 may, for example, be established via a short-range communication link 76 (such as a Wi-Fi or Bluetooth® link), although it will be understood that any suitable short-range or long-range communication links and/or protocols may be employed for this link (and other links) between the network-enabled devices. LAN 125 is, in turn, connected to internet 127.

Computing system 100 further comprises debug processing device 115 that is capable of implementing debug processing of an application provided by cloud-based server 120. In this example, debug processing device 115 is connected to LAN 125 via a wireless communication link. Thus, debug processing device 115 may be thought of as a dedicated debugging device that may be used to provide a remote debugging process for one or more applications provided by cloud-based server 120. It will be understood by those of ordinary skill in the relevant art that a dedicated debugging device may not be implemented, and instead, debug processing capabilities may be provided by any one of (or a combination of) network-enabled device 70, second network-enabled devices 110, and cloud-based server 120.

A debug process implemented by debug processing device 115 may be monitored (for example, by any one of network-enabled device 70, second network-enabled devices 110, and cloud-based server 120) to detect resource contention caused by the debug process. In response to detecting resource contention caused by the debug process, the debug process may be controlled in accordance with a debug policy, wherein the debug policy defines control action to be implemented based on rules relating to the resource(s), the application thread being debugged, the application, or the debug process.

For example, computing system 100 may communicate to debug processing device 115, a control signal instructing debug processing device 115 to undertake a control action. In response to receiving such a control signal, debug processing device 115 may identify and perform the control action.

By way of example only, computing system 100 may comprise a cloud-based server 120 which provides one or more applications as a service for computing system 100. The application(s) may be debugged by a debugging process implemented by the debug processing device 115. When such a debugging process is being implemented, the network-enabled device 70 may implement a debug processing control method according to an embodiment, wherein the debugging process and/or system resource are analyzed and monitored to identify an occurrence (or expected occurrence) of a resource contention caused by the debugging process. In response to identifying an occurrence (or expected occurrence) of such a resource contention, the network-enabled device 70 may generate a warning signal indicative of the (actual or expected) occurrence of resource contention and pass the generated error signal to the cloud-based server 120 (via the LAN 125 and internet 127). The cloud sever 120 may analyze information provided by the warning signal, in conjunction with a debug policy (stored, for example, by the cloud-based server 120), to identify one or more control actions to be implemented for controlling the debug processing.

The cloud-based server 120 may generate a control action assignment signal that is indicative of the identified control action(s). For this purpose, the control action assignment signal may comprise: a control action identifier; a data payload; and/or a control action entry point data. The cloud-based server 120 may then communicate the control action assignment signal to the network-enabled device 70 (via the Internet 127 and the LAN 125).

Network-enabled device 70 may receive the control action assignment signal (via communication interface 72). Communication interface 72 may pass a received control action assignment signal to processor unit 78 of network-enabled device 70 for processing, in accordance with one or more algorithms, to identify the assigned control action from the received control action assignment signal. Processor unit 78 may then control operation of the debug process, an application, or an application resource so as to perform the assigned (that is, the identified) control action. This may be done, for example, by generating and transmitting a command signal to debug processing device 115. Network-enabled device 70 may, for instance, transmit a pause command signal to debug processing device 115 which, in response, causes debug processing device 115 to pause debug processing of an application thread.

A system runtime (for example a Java virtual machine) may therefore enforce a debug policy during processing as a debugger steps through a program.

An overview of debugger operation in some embodiments of the present invention is follows:

A debugger has control over a program by sending commands to the runtime. These commands may include, but are not limited to the following commands: (i) setbreakpoint—set a breakpoint at a specified line; (ii) stepinto—execute the code on the current line, and step into any functions called on that line; (iii) stepover—execute the code on the current line, but do not step into any functions called on that line; (iv) stepreturn—finish and return from the function being executed; (v) resume—release debugger control and resume execution of the thread; and (vi) pause—pause execution of the thread and acquire debugger control.

In some embodiments of the present invention, the runtime being debugged sends information back to the debugger. This information may include, but is not limited to the following information: (i) the line at which the debugger stopped; (ii) the instructions around the current line; (iii) the current values of any visible variables; (iv) the states of threads in the runtime; (v) notification that an exception was thrown; (vi) notification that a state of a thread has changed (for example, the thread has resumed execution or has ended); and (vii) information about acquired locks.

In some embodiments of the present invention, the debug policy allows the system administrator to specify rules that govern how long a thread may be held under the control of a debugger when holding a lock. Example rules that may be specified in such a policy include, but are not limited to the following rules:

RULE 1: The system runtime monitors the depth of the request queue while the thread(s) being debugged are holding locks: The policy could state that if the depth of the request queue hits a certain threshold number—that is, requests are backing up due to the lock being held, then action (see below) must be taken. This would permit the debugger to debug requests in quiet periods without interruption, but would limit impact during busier periods.

RULE 2: The system runtime monitors the frequency that locks are taken, and the average time that those locks are held. This information could be used by the system runtime when the debugger steps into a lock. If the lock is infrequently used, or usually held for a long period of time, then it may be safe for the debugger to take the lock as it cannot adversely impact the system too badly. The policy could permit the debugger to take the lock if this condition is true, and otherwise, to take other action(s) (see below).

RULE 3: The policy defines a period of time that the debugger can hold a lock (a general rule covering a lock or set of locks, or a rule for a specific lock): This information could be used by the system runtime when the debugger steps into a lock. The system runtime would inspect the policy and set an alarm timer as defined by the policy. It would then permit the debugger to take the lock. When the alarm timer expires, if the debugger still has the lock, then action (see below) must be taken.

RULE 4: The system runtime monitors locks to determine whether or not they suffer from heavy contention. This information could be used by the system runtime when the debugger steps into a lock. The system runtime would inspect the policy and identify rules to be applied to locks that are under heavy contention. The policy could refuse the debugger's request to take the lock, in which case action (see below) must be taken.

For at least the example rules above, one or more actions are taken when a rule, or limits imposed in a rule, are violated. Example actions that the system runtime could apply include:

ACTION 1: The system runtime forcibly resumes the thread(s) that are under the control of the debugger. The debugger loses control of the thread(s) for the current request and has to restart debugging the request from the start. The system runtime notifies the debugger that this action was taken and why it was taken.

ACTION 2: The system runtime forcibly resumes the thread(s) that are under the control of the debugger, but only to the point where they release held locks. This is similar to the above action, but imposes a greater level (that is, granularity) of control.

ACTION 3: The system runtime forcibly resumes the thread(s) until after the threads execute instructions that release the held locks. This means that the debugger can continue debugging the in-flight request and examine the state of the program after the lock is released.

ACTION 4: When the debugger requests a lock, the system runtime forcibly resumes the thread(s) that are under the control of the debugger, but only to the point where they release held locks. This is similar to the above action, but does not permit debugger control of thread(s) while they are holding locks. The debugger can only debug code and program state before the lock is held and after the lock is released.

ACTION 5: The system runtime throws an exception or interrupts the thread(s) under the control of the debugger: Instead of allowing the thread(s) under the control of the debugger to resume execution, the thread is interrupted in such a way that the program rolls back. This means that the in-flight request is not allowed to proceed to completion unless it is debugged to the end. This may be useful if there is a monetary cost associated with the code defect being debugged (that is, each request that doesn't work costs someone money), and finishing the request without resolving the problem would incur those costs.

ACTION 6: Automatically steps through a thread being debugged until the thread releases a lock, if the thread being debugged is deemed to be impacting other threads, other transactions, and/or other users.

Figure 2:
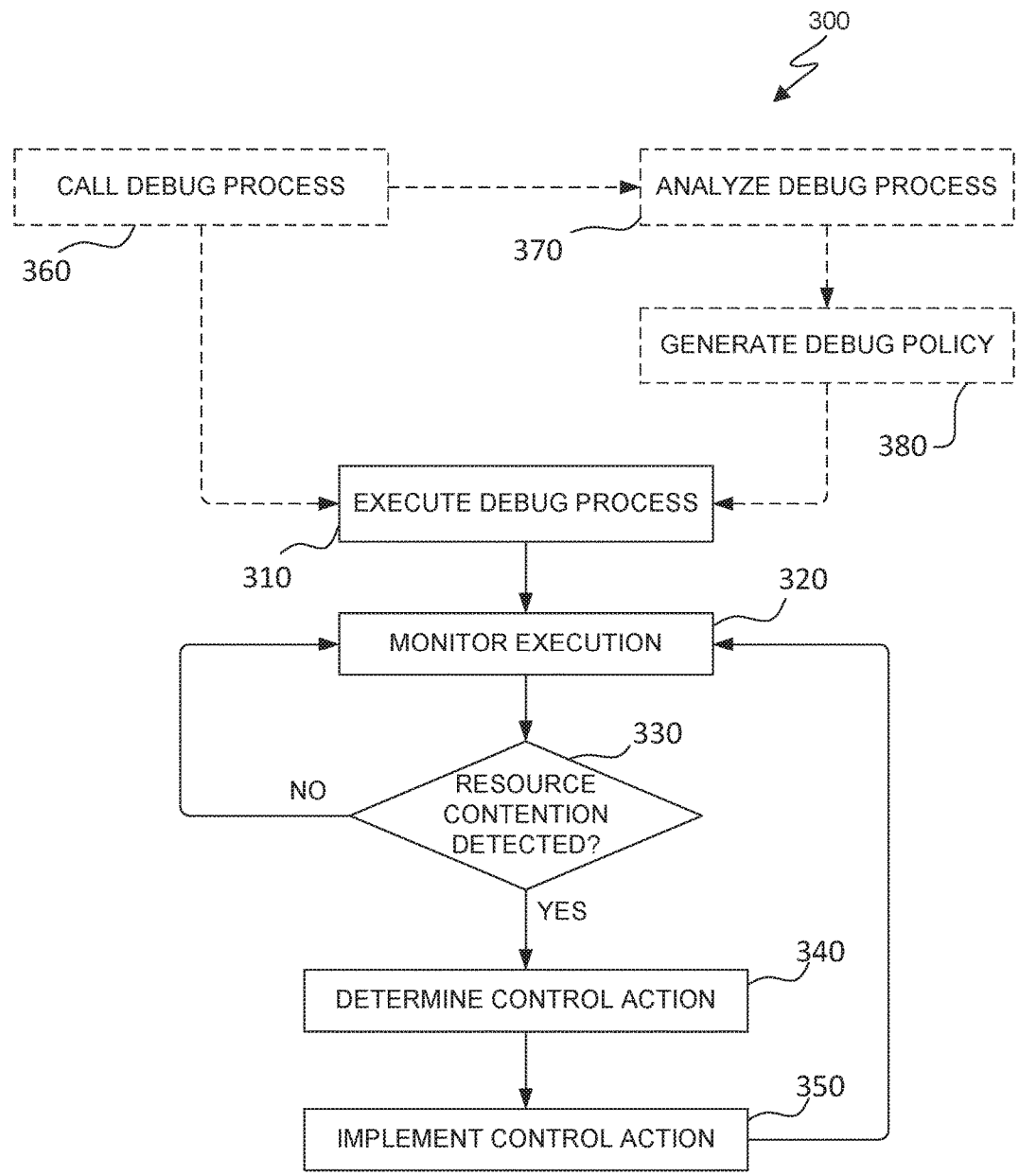
FIG. 2 is a flowchart showing a computer-implemented method in accordance with at least one embodiment of the present invention.

With reference now to FIG. 2, computer-implemented method 300 controls debug processing that may be employed in some embodiments of the present invention. Here, the method is described as being implemented by a network-enabled device according to a proposed embodiment (such as a cloud server, for example).

Processing begins where a debug process is executing (310). By way of example, the debug process may be executed such that it performs debug processing on a thread of an application, wherein other threads of the application may be used by other users.

A debug management component monitors (320) the execution of the debug process to detect resource contention caused by the debug process, by, for example, monitoring the performance of specific items and/or parameters including: response times; average number of locks; lock wait times; input/output delays; request queue backlog; central processing unit (CPU) usage, etc.

The debug management component determines (330) whether or not a resource contention has been detected. Resource contention may thus comprise lock sources which are preferred to be mitigated during the debug process. The location of the debug process may thus be monitored to check for entering/exiting of such lock areas.

Based on the determination result, the method may decide whether to loop back to 320 to continue monitoring the debug process, or to proceed to 340. For instance, if it is determined that no resource contention has been detected (330, "No" branch), processing proceeds at 320.

If it is determined that a resource contention has been detected (330, "Yes" branch), the debug process is controlled by undertaking one or more control actions (340) in accordance with a debug policy.

In some embodiments of the present invention, the debug policy is associated with an application, and may be obtained from a server computer that is capable of implementing at least part of the application. Thus, the debug policy is application-specific and made available with the application.

In some embodiments of the present invention, the debug policy is a general debug policy and may be obtained from a server computer that implements at least part of the application. Thus, the debug policy is general and made available to be implemented with multiple applications running, at least in part, on the server computer.

In still other embodiments, the debug policy is in part, associated with, and made available with the application, and in further part, associated with a general policy applicable to multiple applications running the server computer.

In some embodiments, the debug policy may comprise information defining a control action to be implemented based one or more rules relating to at least one of: the resource; the thread; the application; and the debug process. For instance, the debug policy may be formed from a plurality of rules defining how the debug process may execute on the thread of the application. The rules may relate to at least one of: a depth of a request queue for the application; a frequency of resource use; a duration of resource contention; an acceptable time limit for the duration of a resource contention; and a level of resource contention. In this way, various factors, which may influence application performance for example, may be accounted for when defining how the debug process may execute.

In some embodiments of the present invention, the debug policy may be interrogated to determine a control action to be performed, based on the detected resource contention. Control actions may comprise at least one of: preventing execution of the debug process; pausing execution of the debug process; resuming operation of the thread; interrupting the thread; generating an exception signal; jumping to a new debug location (for example, after a detected resource conflict); forcibly detaching the debugger; and re-starting the process in a non-debug mode. For example, such control actions may be undertaken when the rules of the debug policy are not met. The actions may therefore vary from not being able to debug a lock area at all, through to having restrictions placed upon debugging these sections (such as having a maximal request queue size before automatically being moved to the next line outside the lock area).

Control action(s) are performed (350), thereby controlling the debug processing in accordance with the debug policy.

Processing then loops back to 320 (so as to continue monitoring the debug process). Thus, at all times the debug processing is executed, the debug processing may be monitored and the debug policy may define control behavior in proximity to lock areas.

Thus, from the above description of the method of FIG. 2, it will be appreciated that a debug policy may be pre-defined and hosted by a provider (from which the debug policy may be obtained). However, it should also be appreciated that embodiments may or may not require the step of obtaining a pre-defined debug policy. For instance, another embodiment may comprise the additional operations of: analyzing 370 the application to identify one or more potential resource contentions; and generating 380 or updating the debug policy based on the identified potential resource contention(s). Such additional and/or optional operations are indicated in the flow diagram of FIG. 2 using dashed lines and boxes. A debug policy may therefore be locally generated according to requirements.

Moreover, it is noted that embodiments may further comprise initiating execution of the debug process (360) on the thread of the application such that: (i) debug information is logged with respect to the thread; and (ii) debug information is not logged with respect to one or more other threads of the application. Put another way, an embodiment may include calling a debug process (360) that enables targeted data collection for analysis. Again, such an additional and/or optional operations are indicated in the flow diagram of FIG. 2 using dashed lines and boxes.

It will therefore be understood that some embodiments of the present invention provide a debugging component for attaching to a process and stepping through execution on a thread, along with a monitoring component for monitoring lock contention and impact to other threads when thread being debugged holds the lock. A policy applying component may then be used for taking appropriate action as defined in a policy when a thread being debugged is holding/attempts to take a lock.

A system implementing a proposed embodiment may be particularly advantageous in debugging of Software as a Service (SaaS) offerings when multiple users may be using the application at any point in time. For example, an embodiment may enable an application to not be noticeably affected by debugging for a particular user or transaction.

Also, proposed implementations may provide for the ability to define a policy that restricts a debugger from holding locks or constraining resources that may impact other users of a service. A system administrator may, for example, define and apply such a policy before granting access to the debugger such that it can attach to the system.

As will be apparent from the above description, an embodiment, application and/or resource may be provided by a cloud-computing system. Also, a debug process control server/application according to an embodiment may be provided or implemented by a cloud-computing system.

It is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and environment is made purely for the purposes of explanation and understanding.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This off-premise cloud model may include at least five characteristics, at least three service models, and at least four deployment models.

Characteristics of a cloud computing service delivery model include the following:

On-demand self-service: a cloud consumer can unilaterally provide computing capabilities, such as server time and network storage, as needed automatically without requiring human interaction with the service provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
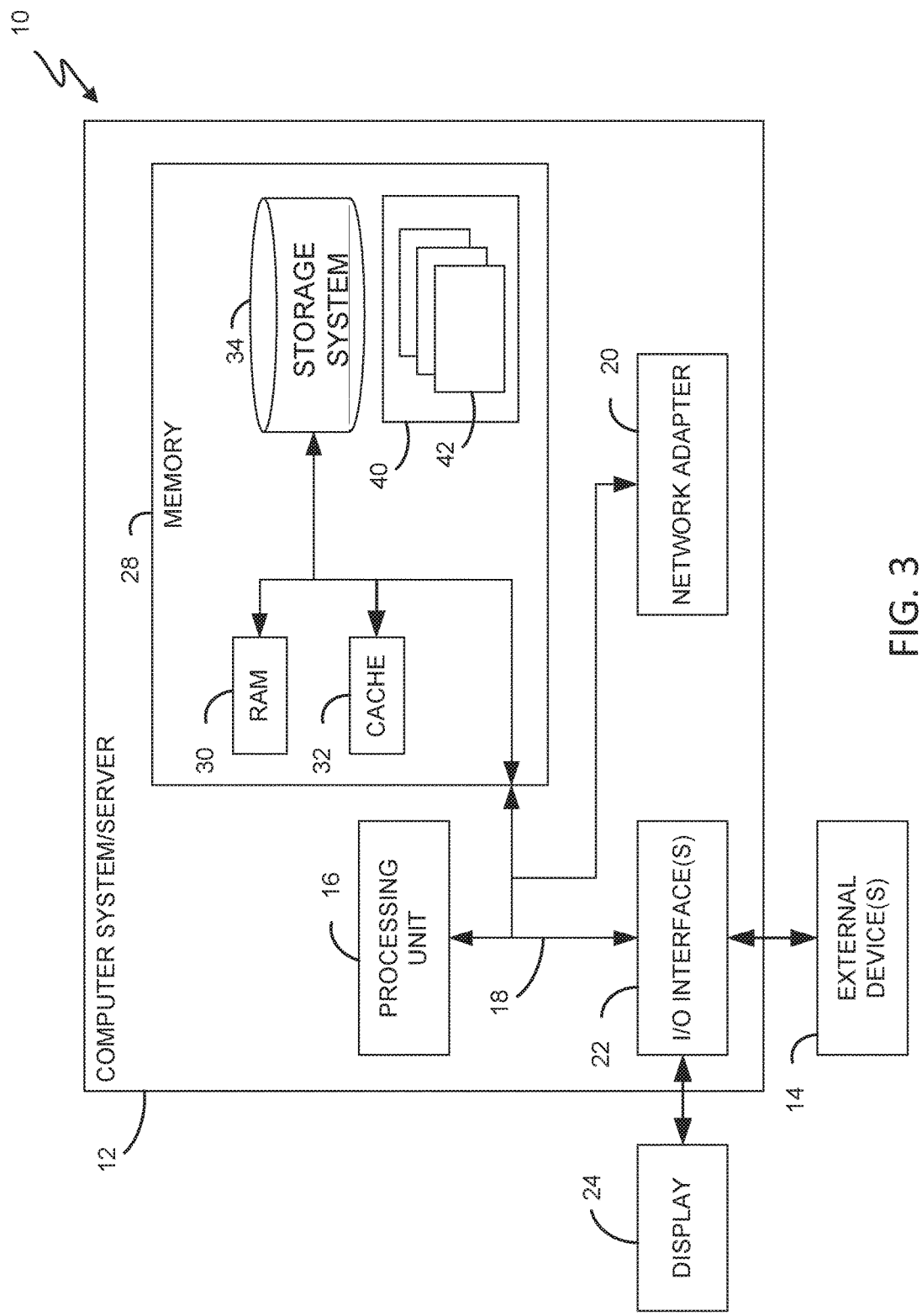
FIG. 3 is a block diagram of a cloud system node in accordance with at least one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Cloud computing node 10 includes computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to; one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced Industry Standard Architecture (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 4:
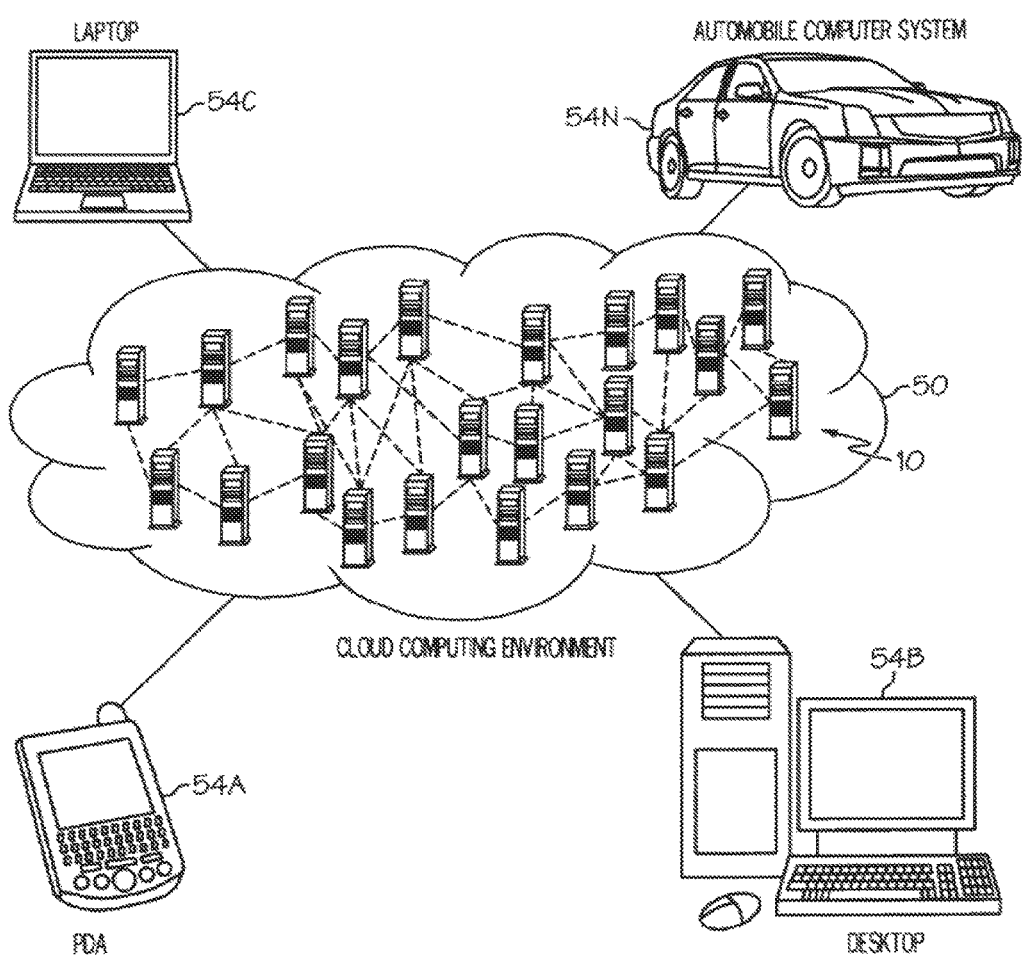
FIG. 4 is a diagram of a cloud computing environment in accordance with at least one embodiment of the present invention.

Referring now to FIG. 4, illustrative cloud computing environment or cloud computing system 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (for example, using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Controlling debug processing provides for the control of a debugging process on a thread of an application, according to proposed concepts as detailed above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In the context of the present application, where embodiments of the present invention constitute a method, it should be understood that such a method is a process for execution by a computer, that is, a computer-implementable method. The various steps of the method therefore reflect various parts of a computer program, for example, various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method of controlling debug processing,
   the method comprising:
   identifying a potential resource contention based on an application;

generating a debug policy based on the identified potential resource contention;

detecting during execution of a debug process, a resource contention between a first thread of the application and the debug process;

determining the resource contention is caused at least in part, by the debug process; and in response to determining the resource contention is caused, at least in part, by the debug process, controlling execution of the debug process in accordance with the debug policy.

2. The computer-implemented method of claim 1, wherein the debug policy comprises at least one rule defining how the debug process may execute on the first thread of the application.

3. The computer-implemented method of claim 1, further comprising:

obtaining the debug policy from a server computer;

wherein the debug policy is centrally defined, managed, modified, stored and distributed.

4. The computer-implemented method of claim 1, further comprising:

analyzing the application to identify a potential resource contention; and generating the debug policy based, at least in part, on the identified potential resource contention.

5. The computer-implemented method of claim 1, further comprising:

initiating execution of the debug process on the first thread of the application;

wherein:

debug information is logged with respect to the first thread; and debug information is not logged with respect to a second thread of the application.

6. The computer-implemented method of claim 1, wherein execution of the debug process comprises:

interrogating the debug policy to identify the control action to be performed, based at least in part, on the resource contention; and performing the control action.

7. The computer-implemented method of claim 1, wherein the application is implemented by a virtual machine.

8. The computer-implemented method of claim 1, wherein the application is provided as a service of a cloud server.

9. A computer program product for controlling debug processing, comprising:

one or more computer readable storage media and program instructions stored on the one or more computer readable storage media, the program instructions comprising instructions to perform:

identifying a potential resource contention based on an application;

generating a debug policy based on the identified potential resource contention;

detecting during execution of a debug process, a resource contention between a first thread of the application and the debug process;

determining the resource contention is caused at least in part, by the debug process; and in response to determining the resource contention is caused, at least in part, by the debug process, controlling execution of the debug process in accordance with the debug policy.

10. The computer program product of claim 9, wherein the debug policy comprises at least one rule defining how the debug process may execute on the first thread of the application.

11. The computer program product of claim 9, wherein the program instructions further comprise program instructions to perform:

obtaining the debug policy from a server computer;

wherein the debug policy is centrally defined, managed, modified, stored and distributed.

12. The computer program product of claim 9, wherein the program instructions further comprise program instructions to perform:

analyzing the application to identify a potential resource contention; and generating the debug policy based, at least in part, on the identified potential resource contention.

13. The computer program product of claim 9, wherein the program instructions further comprise program instructions to perform:

initiating execution of the debug process on the first thread of the application;

wherein:

debug information is logged with respect to the first thread; and debug information is not logged with respect to a second thread of the application.

14. The computer program product of claim 9, wherein execution of the debug process comprises program instructions to perform:

interrogating the debug policy to identify the control action to be performed, based at least in part, on the resource contention; and performing the control action.

15. A computer system comprising:

one or more computer processors;

one or more computer-readable storage media;

program instructions stored on the computer-readable storage media for execution by at least one of the one or more processors, the program instructions comprising instructions to perform:

identifying a potential resource contention based on an application;

generating a debug policy based on the identified potential resource contention;

detecting during execution of a debug process, a resource contention between a first thread of the application and the debug process;

determining the resource contention is caused at least in part, by the debug process; and in response to determining the resource contention is caused, at least in part, by the debug process, controlling execution of the debug process in accordance with the debug policy.

16. The computer system of claim 15, wherein the debug policy comprises at least one rule defining how the debug process may execute on the first thread of the application.

17. The computer system of claim 15, wherein the program instructions further comprise program instructions to perform:

obtaining the debug policy from a server computer;

wherein the debug policy is centrally defined, managed, modified, stored and distributed.

18. The computer system of claim 15, wherein the program instructions further comprise program instructions to perform:

analyzing the application to identify a potential resource contention; and generating the debug policy, based at least in part, on the identified potential resource contention.

19. The computer system of claim 15, wherein the program instructions further comprise program instructions to perform:

initiating execution of the debug process on the first thread of the application;

wherein:

debug information is logged with respect to the first thread; and debug information is not logged with respect to a second thread of the application.

20. The computer system of claim 15, wherein the application is implemented by a virtual machine.

* * * * *